(12) United States Patent     (10) Patent No.: US 7,913,254 B2
Pospiech     (45) Date of Patent: Mar. 22, 2011

(54) METHOD AND SYSTEM FOR MAPPING THREADS OR TASKS TO CPUS IN A PARALLEL COMPUTER

(75) Inventor: Christoph Pospiech, Dresden (DE)

(73) Assignee: International Business Machines Corporation, Armonk, NY (US)

( * ) Notice: Subject to any disclaimer, the term of this patent is extended or adjusted under 35 U.S.C. 154(b) by 1562 days.

(21) Appl. No.: 11/247,441

(22) Filed: Oct. 11, 2005

(65) Prior Publication Data

US 2006/0080663 A1     Apr. 13, 2006

(30) Foreign Application Priority Data

Oct. 11, 2004    (EP) .................................... 04104970

(51) Int. Cl.
    *G06F 9/46*     (2006.01)
(52) U.S. Cl. .......... 718/100; 718/102; 718/104; 718/108
(58) Field of Classification Search .................. 718/100, 718/102
See application file for complete search history.

(56) References Cited

U.S. PATENT DOCUMENTS

| | | | | |
|---|---|---|---|---|
| 5,202,987 A | * | 4/1993 | Bayer et al. ................... | 718/102 |
| 5,692,193 A | * | 11/1997 | Jagannathan et al. ........ | 718/106 |
| 7,143,412 B2 | * | 11/2006 | Koenen ......................... | 718/102 |
| 2003/0041316 A1 | * | 2/2003 | Hibbeler et al. .............. | 717/130 |
| 2004/0064817 A1 | * | 4/2004 | Shibayama et al. .......... | 718/104 |

OTHER PUBLICATIONS

Agarwal, "Strategies for Topology-Aware Task Mapping and for Rebalancing with Bounded Migrations", 2003, Indian Institute of Technology, pp. 1-65.*

* cited by examiner

*Primary Examiner* — Kenneth Tang
(74) *Attorney, Agent, or Firm* — Cantor Colburn LLP; William Kinnaman

(57) ABSTRACT

The present invention provides a new method and system to provide a flexible and easily reconfigurable way to map threads or tasks of a parallel program to CPUs of a parallel computer. The inventive method replaces the necessity of coding the mapping of threads or tasks to CPUs in the parallel computer by looking up in a mapping description which is preferably presented in form of least one table that is provided at runtime. The mapping description specifies various mapping strategies of tasks or threads to CPUs. Selecting of a certain mapping strategy or switching from a specified mapping strategy to a new one can be done manually or automatically at runtime without any decompilation of the parallel program.

10 Claims, 7 Drawing Sheets

| tasks \ threads | 0 | 1 |
|---|---|---|
| 0 | −1 | |
| 1 | | |
| 2 | | |
| 3 | | |
| 4 | | |
| 5 | | |
| 6 | | |
| 7 | | |

Strategy 0

| tasks \ threads | 0 | 1 |
|---|---|---|
| 0 | 0 | 1 |
| 1 | 2 | 3 |
| 2 | 0 | 1 |
| 3 | 2 | 3 |
| 4 | 4 | 5 |
| 5 | 6 | 7 |
| 6 | 4 | 5 |
| 7 | 6 | 7 |

Strategy 1

| tasks \ threads | 0 | 1 |
|---|---|---|
| 0 | 0 | 1 |
| 1 | 4 | 5 |
| 2 | 0 | 1 |
| 3 | 4 | 5 |
| 4 | 2 | 3 |
| 5 | 6 | 7 |
| 6 | 2 | 3 |
| 7 | 6 | 7 |

Strategy 2

| threads | 0 | 1 | 2 | 3 | 4 | 5 | 6 | 7 | 8 | 9 | 10 | 11 |
|---|---|---|---|---|---|---|---|---|---|---|---|---|
| CPUs | 0 | 1 | 2 | 3 | 4 | 5 | 6 | 7 | 8 | 9 | 10 | 11 |

FIG. 3

| tasks \ threads | 0 | 1 | 2 | 3 |
|---|---|---|---|---|
| 0 | 0 | 5 | 1 | 7 |
| 1 | 3 | 4 | 2 | 6 |
| 2 | 0 | 5 | 1 | 7 |
| 3 | 3 | 4 | 2 | 6 |
| 4 | 0 | 5 | 1 | 7 |

FIG. 5

| tasks \ threads | 0 | 1 |
|---|---|---|
| 0 | −1 | |
| 1 | | |
| 2 | | |
| 3 | | |
| 4 | | |
| 5 | | |
| 6 | | |
| 7 | | |

Strategy 0

| tasks \ threads | 0 | 1 |
|---|---|---|
| 0 | 0 | 1 |
| 1 | 2 | 3 |
| 2 | 0 | 1 |
| 3 | 2 | 3 |
| 4 | 4 | 5 |
| 5 | 6 | 7 |
| 6 | 4 | 5 |
| 7 | 6 | 7 |

Strategy 1

| tasks \ threads | 0 | 1 |
|---|---|---|
| 0 | 0 | 1 |
| 1 | 4 | 5 |
| 2 | 0 | 1 |
| 3 | 4 | 5 |
| 4 | 2 | 3 |
| 5 | 6 | 7 |
| 6 | 2 | 3 |
| 7 | 6 | 7 |

Strategy 2

FIG. 9

METHOD AND SYSTEM FOR MAPPING THREADS OR TASKS TO CPUS IN A PARALLEL COMPUTER

CROSS-REFERENCE TO RELATED APPLICATION

This application claims the priority benefit under 35 U.S.C. §119 of European patent application 04104970.1, filed Oct. 11, 2004, and incorporated herein by reference.

BACKGROUND OF THE INVENTION

1. Technical Field of the Invention

The present invention relates to method and system for mapping threads or tasks of a parallel program to CPUs of a parallel computer.

2. Background Art

A parallel computer is either a single computer having multiple CPUs or several computers connected with a network such that at least one of them has multiple CPUs.

Parallel programs exploiting this parallel computer either start several instances of themselves (usually called tasks) or split into subprograms, each handling a sequence of instructions in parallel (usually called threads).

A typical example of a parallel program is shown in FIG. 1. FIG. 1 shows three tasks spawning two threads each. A possible case could be that the parallel program has to solve a certain problem for different initial parameters. Then each thread is endowed with the solution of the problem for one of those parameters. In FIG. 1 each task would solve the problem for two parameters by delegating one parameter to each thread. The threads are supposed to run on different CPUs.

Initial Problem

In general the mapping of threads or tasks to different computers in the network is done manually by the user, e.g. by writing a file containing the names of the computers. The mapping of threads to CPUs inside those computers is usually automatically done by the operating system.

If the user wants to improve the performance of the parallel program on the current computer, or if he wants to simulate the performance of the program on a differently architected parallel computer, he needs to replace the automatic mapping by a mapping of his own.

Replacing the automatic mapping by manual mapping of the tasks or threads to the CPUs of a computer can only be done if the operating system provides a command or a subroutine (system call) that binds a specific task or thread to a specified CPU.

If the goal is performance improvement of the parallel program, the optimal mapping is far from obvious. It is therefore desirable to try different mappings and easily switch from one to the other.

If the user is out for the optimization of the performance, and if execution time of the program stays within minutes, it is sufficient to test several mappings for the program. If the program, however, executes a loop of instructions many times and runs for hours, it is desirable to use the first loop iterations for calibration and run the remaining loop iterations with the optimal customized map. This of course is only possible if the map can be changed at runtime.

Prior Art

If the operating system provides a command or a subroutine (system call) that binds a specific task or thread to a specified CPU, the following user actions would be needed.

If the user has the choice and decides for the use of the command, he has to find all task or thread identifiers and has to run one command for each task or thread of the parallel program, possibly even logging in on the various nodes where his threads and tasks are running. By the time he has done all this, either the parallel program has already finished or it has progressed significantly in its run. So the remapping of the tasks or threads either did not come into effect at all or is taking on too late. At any rate, the remapping of tasks or threads was not done concurrently, but one at a time with various delays in between.

Therefore, the only feasible solution is given by each thread or task of the parallel program issuing a system call for binding itself to a certain CPU of the node and all of these calls occurring in parallel. FIG. 2 shows how three tasks spawn two threads each, and each of the threads binds itself to a CPU.

Residual Problem

As a consequence of the above-mentioned user actions for manual binding, the user not only has to add the system call to the source code of the parallel program, but also has to add code lines to implement the mapping, i.e. the rules specifying which thread or task is assigned to which CPU.

As a result, only the simplest mappings are usually implemented by programmers. As every mapping is implemented in the source code, a change requires a full development cycle, which involves all of the following: (1) formulation of a new mathematical function; (2) implementation in the source code; and (3) debugging and testing. This significantly slows down the test of various mappings and even prevents the change of the mappings at runtime.

The implemented assignment in most cases simply is thread/task 0 to CPU 0, thread/task 1 to CPU 1, thread/task 2 to CPU 2 etc. These assignments are shown as a table in FIG. 3.

SUMMARY OF THE INVENTION

An object of this invention is to provide a method and system for mapping threads or tasks of a parallel program to CPUs of a parallel computer avoiding the disadvantages as described before.

The present invention provides a method and system to provide a flexible and easily reconfigurable way to map threads or tasks of a parallel program to CPUs of a parallel computer. The inventive method obviates the necessity of coding the mapping of threads or tasks to CPUs in the parallel computer by looking it up in a mapping description which is preferably presented in the form of least one table that is provided at runtime. The mapping description specifies various mapping strategies of tasks or threads to CPUs. Selecting of a certain mapping strategy or switching from a specified mapping strategy to a new one can be done manually or automatically at runtime without any decompilation of the parallel program.

An essential advantage of the present invention compared with the prior art is that the mapping description in the table is not part of the program itself. Changing the mapping no longer involves reprogramming, but is basically a table lookup.

BRIEF DESCRIPTION OF THE DRAWINGS

The present invention is illustrated by way of example and is not limited by the shape of the figures of the drawings in which:

FIG. 3 shows a simple prior art mapping of threads to CPUs if only threads are available;

FIGS. 5 to 10 show a preferred embodiment of the present invention.

DESCRIPTION OF THE PREFERRED EMBODIMENTS

Figure 1:
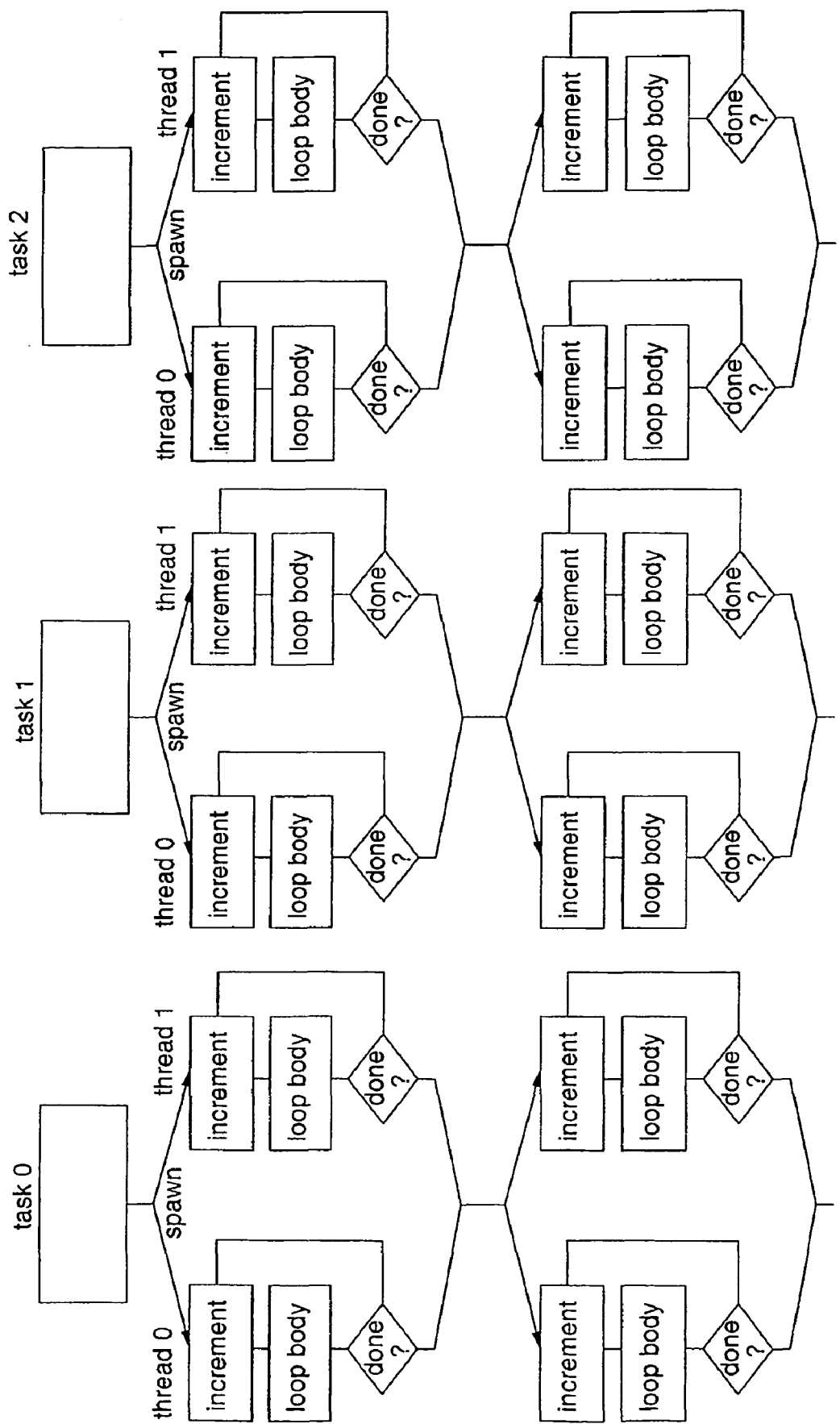
FIG. 1 shows a typical flow diagram of a parallel program.
Figure 2:
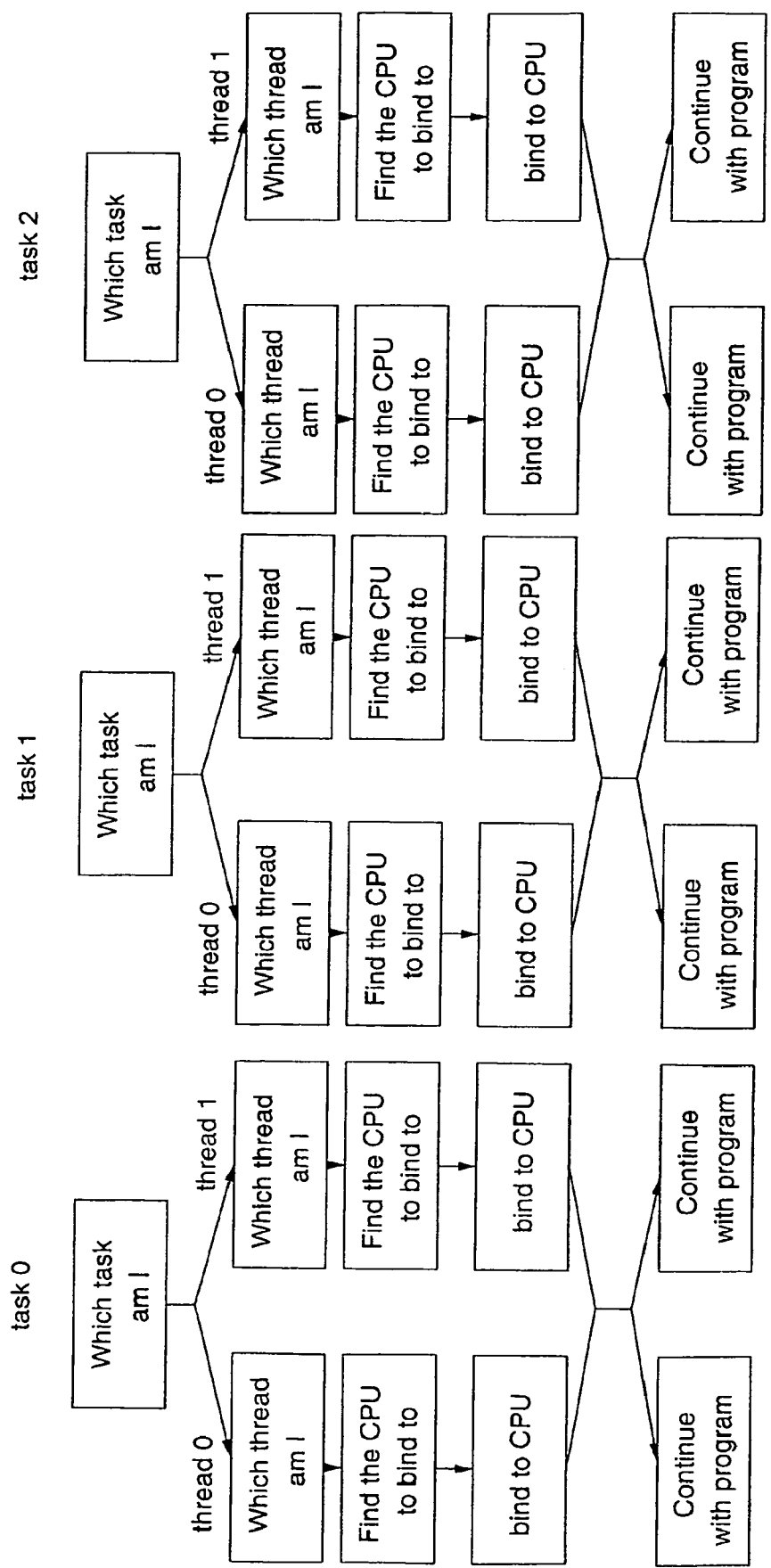
FIG. 2 shows a prior art mapping.
Figure 4:
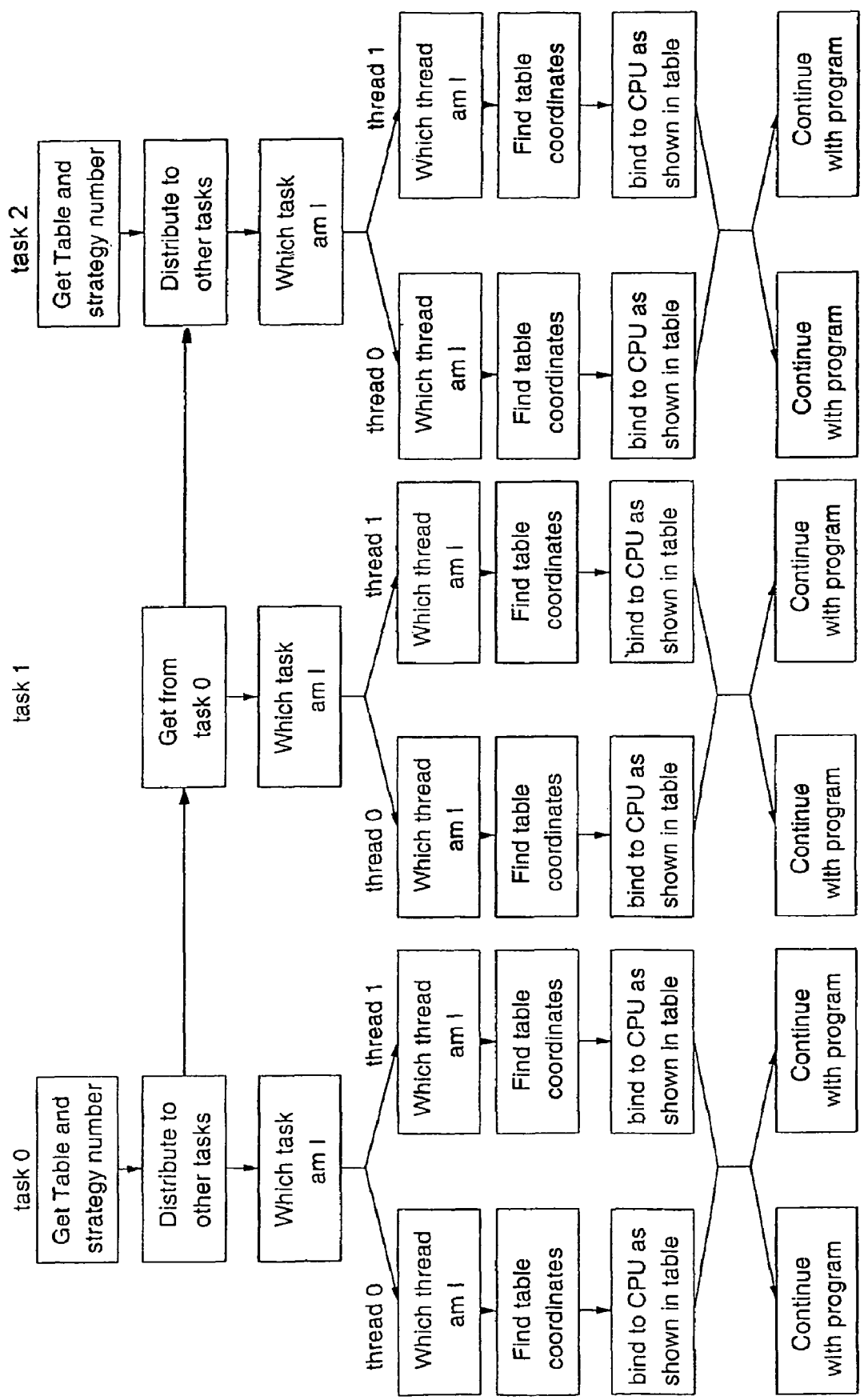
FIG. 4 shows the basic mapping steps according to the present invention.

The flow chart of FIG. 4 shows the basic inventive method for choosing and executing a mapping strategy in a parallel computer.

A prerequisite to this method is a parallel program to be executed on a single computer having multiple CPUs or several computers connected with a network such that at least one of them has multiple CPUs.

Prior to execution of a parallel program the user lays down several preferred mapping strategies in a table, e.g. in a file or in an environment variable.

In preferred embodiment, the user introduces a call to a subroutine which is described below in more detail.

During execution of the program, the subroutine is called by each task or thread and executes the following steps:

1. One of the tasks gets a mapping description, preferably the first one (get table). The mapping description is preferably laid down in a file and is stored in a nonvolatile memory.

The mapping description is preferably laid down in form of a table, e.g. as a three-dimensional table (see preferred embodiment of the present invention), and specifies various mapping strategies of tasks or threads to CPUs. In the preferred embodiment of the present invention, each thread determines the CPU to bind to by a lookup in the three-dimensional table that is set up prior to the start of the program. Each row corresponds to a different task identifier, each column represents a different thread identifier, and the vertical levels describe the various mapping strategies. The table entry at position (i, j, k) describes the CPU to which thread j in task i is mapped under strategy k.

2. Choosing a certain mapping strategy (manually or automatically; get strategy number).

3. Distributing the mapping description to all tasks and storing it in a local memory of a computer (task 1, task 2).

4. Determining for each task or thread its assigned CPU based on the specified mapping strategy, e.g. the mapping strategy is laid down in the form of a table, each thread or task determines the row based on the mapping strategy and the column based on its own task or thread identifier resulting in a unique CPU identifier (which task am I, find table coordinates).

5. Each thread calls the operating system subroutine that binds a specific task or thread to the CPU specified by the resulting table entry (bind to CPU shown in table).

6. Continue the program.

In one embodiment of the present invention the mapping strategies can be laid down at runtime, especially by a user dialog which is provided by the parallel program.

In a further embodiment of the present invention the switching from one mapping strategy to another one can be specified at runtime either automatically or manually.

FIGS. 4-10 show preferred embodiments of the present invention.

Without loss of generality, task, thread and CPU identifiers can be assumed to be consecutive numbers starting at 0. If they are not, they are representable in a computer and therefore are given by a sequence of ASCII characters (usually called a string). Then a numbering can be easily obtained by a lexicographical sort of the strings. In terms of implementation, this sort (done by calling a standard sort technique like quick sort) establishes a forward lookup for the string assigned to a number. The backward lookup for the number assigned to a string would be given by a convenient hash function.

In the vast majority of cases, the translation of identifiers to numbers is not necessary, as the identifiers are already consecutive numbers starting at 0.

Almost all of the shared-memory programming paradigm implementations adhere to the OpenMP standard which numbers the threads starting at 0. Each thread can find out its identification by a call to omp_get_thread_num(), which returns an integer ranging from 0 to #threads−1.

Similarly, almost all distributed memory programming paradigm implementations adhere to the MPI standard which numbers the tasks starting at 0. Each task can find out its identification by a call to MPI_Comm_rank (), which returns an integer ranging from 0 to #tasks−1.

Correspondence between Mapping Rules and Tables

Every thread or task queries for its own pair of task and thread identifiers and determines the CPU identifier before binding itself to the CPU.

Any such mapping (i, j)→c is a mathematical function, defined on a product of finite sets with images in a finite set. Any such function can be uniquely represented as a table. An example of such a table is given in FIG. 5 (generic mapping with 4 threads per task and 8 CPUs per node). Conversely, any table with randomly chosen entries defines a mapping. So there is a one-to-one correspondence between mappings and tables. Therefore the use of tables in this context does not mean a reduction to a special case.

Several such mappings can be stacked in vertical direction to form a three-dimensional table.

Table Periodicity

The example depicted in FIG. 5 shows some periodicity, as all the even rows and all the odd rows are identical. This is not an uncommon feature. The example was derived from the situation where there are 8 CPUs per node and the program runs 5 MPI tasks with 4 threads per task. As we have 4 threads per task and 8 CPUs per node, a maximum of two tasks can be placed on a node. The example assumes that tasks 0 and 1 go to the same node, as do tasks 2 and 3. Task 4 goes to a separate node. The mapping of threads to CPUs was chosen identically for each node, which immediately leads to the periodic pattern.

While the specific settings of CPUs per node and threads per task led to the periodic pattern, it is not possible to read this information back from the table. In the example, the product of the period lengths 8=2×4 coincided with the number of CPUs per node. In general, however, this is not necessarily the case.

For example, one might want to choose the identical pattern for every other node, which would lead to a product of periods of 16=4×4. As another example, one may choose to place one task per node, but with an assignment of threads to CPUs that is identical on each node. This shortens the product of periods to 4.

This shows that the lengths of the periods is inherent to the assignment strategy, and does not (primarily) depend on the number of CPUs per node or threads per task.

The invention does not depend on this periodicity, but the periodicity offers a nice way to save some typing when specifying the assignment strategy. Indeed, it is sufficient to specify the top left corner of the table, one full period in the row and column directions. The pattern can be periodically repeated in each direction to fill the table.

As a special example, it is desirable, though not needed for the invention, to specify a "do nothing" strategy as the first vertical level of the table. The entries for the "do nothing" strategy are derived from the API of the system call. Frequently, the system call allows one to specify "no binding" if a magic number (usually −1) is passed as the parameter for the CPU identifier. If this magic number is specified as a single item in the top left corner, as shown for the leftmost example (strategy 0) in FIG. 9, the above periodicity mechanism fills the whole vertical level with this magic number and subsequently every thread calls the system call with the "no binding" parameter. This allows one to compare whatever assignment strategy with the original one provided by the operating system.

The table is entered in a text file, one line for each row; the numbers are separated by white space. An empty line separates the different vertical levels that represent different strategies.

Table Setup for Nonstandard Task-To-Node Mappings

The following is an example of how to set up a row for a table in a step-by-step fashion. The example was chosen with a practical background and to demonstrate that the invention is also able to handle complicated environments.

This example deals with a numerical program to perform a local area weather forecast. For the current purpose, the only interest is how to split the work into parallel tasks (and threads) and how to distribute these threads over the various CPUs of a parallel computer. Of course, many fluid dynamics and linear algebra codes have a similar behavior. But the context of weather forecast allows one to build analogies and helps to explain the (otherwise abstract) matter.

Figure 6:
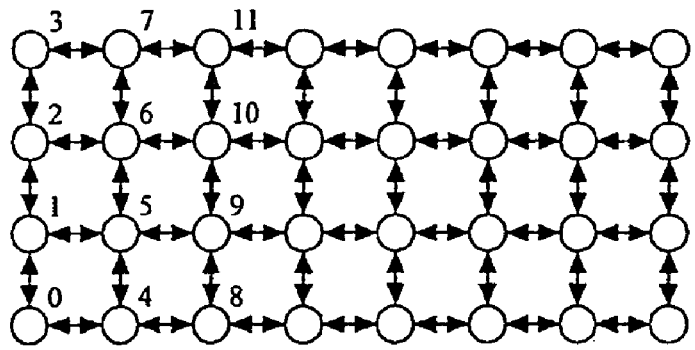
Figure 6:
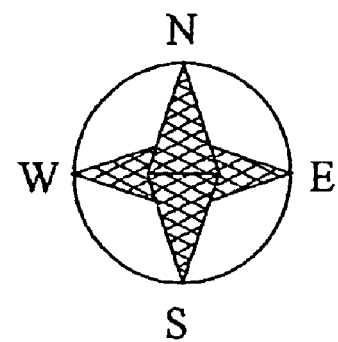

A local weather forecast code predicts the weather of a (in most cases) rectangular forecast domain, which is bounded by lines of constant latitude for the north and south boundaries and lines of constant longitude for the east and west boundaries. The split of the work to MPI (Message Passing Interface) tasks is usually done by splitting both the latitude and the longitude intervals into equal pieces, which puts a rectangular grid on the forecast domain. Then each MPI task is assigned the forecast of a rectangular subdomain. If the whole forecast domain comprises all of Europe and a good deal of the Atlantic Ocean, one of the MPI tasks specializes to a rectangle containing, say, the upper Rhine valley. This task communicates with the neighboring tasks in northern, eastern, southern and western directions. FIG. 6 (numbering of tasks in a two-dimensional task array) indicates the MPI tasks as little circles and shows the communication pattern by arrows.

Figure 7:
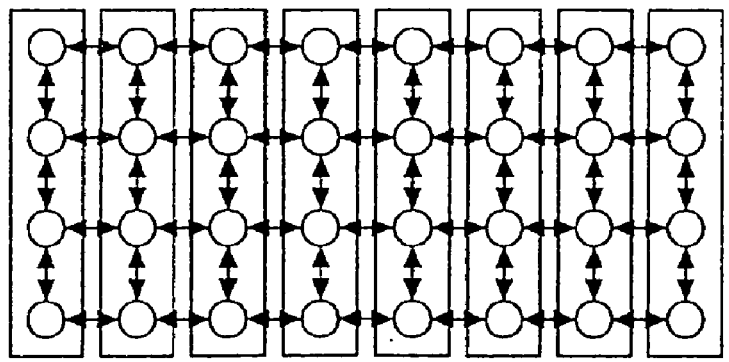
Figure 7:
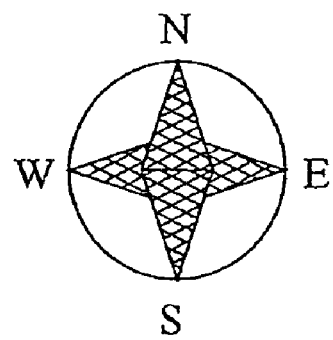

Although the MPI tasks are numbered 0 to #tasks−1, the application context imposes a two-dimensional topology. The usual mapping of the number to the geographical position is shown in FIG. 6. If the user doesn't decide otherwise, tasks with consecutive numbers are assigned to the same node. Mapped back to the geographical situation, the situation is depicted in FIG. 7 (default assignment of tasks to nodes). The rectangles enclosing several circles indicate the node boundaries.

Figure 8:
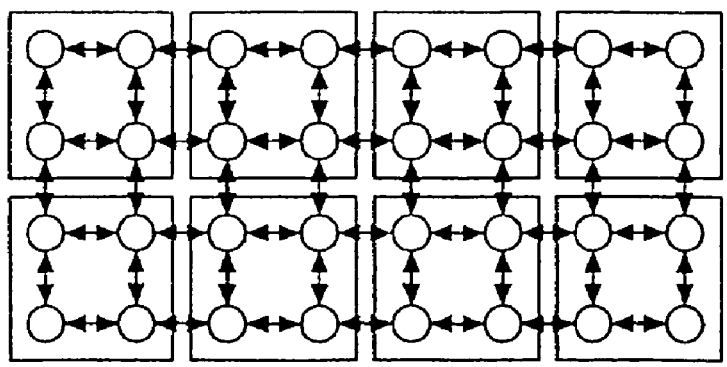
Figure 8:
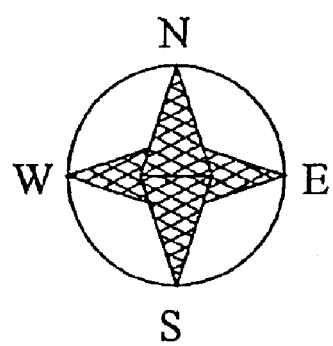

For reasons that will not be explained here, it is desirable to choose a different assignment of MPI tasks to nodes, which is shown in FIG. 8 (reassigning tasks in a blockwise fashion). Note that tasks 0, 1, 4, 5 go to one node, while tasks 2, 3, 6, 7 go to the neighboring node. Finally, the user chooses to split each task into two threads, which share the work of the forecast on the assigned subdomain.

Suppose now that we are running on a cluster of 8-way nodes, so tasks with two threads each go onto one node. The invention is used to map the different threads to the CPUs per node. FIG. 9 (various mappings for the task assignments in previous figures) shows in the rightmost two examples (strategy 1 and strategy 2) two possible assignments, which both arrange for the two threads to run on neighboring CPUs. Note that the first two rows are for the first node, while the next two rows are for a neighboring node. The next two rows are for the first node again, and the last two rows are for the neighboring node. The rows end after 16 columns. It is only necessary to specify a subtable with 2 columns and 8 rows. The remaining table is obtained by repeating this pattern.

Subroutine Implementing a Preferred Embodiment of the Present Invention

After completing the table the user would open the source code of the parallel program and add a call to a subroutine. The flow chart of this subroutine is depicted in FIG. 4. The subroutine performs the following steps:

1. Get the mapping description.
    Get the file name of the table and the level number k. See below for a discussion of various choices to do this.
    Read the table.
2. If there are several tasks, only one gets the mapping description and distributes it to the other tasks.
    In case of MPI, the latter is a call to MPI_Bcast().
3. Find the own task identification i.
    In case of MPI, this is a call to MPI_Comm_rank().
4. Find the own thread identification j.
    In case of OpenMP, this is a call to omp_get_thread_num( ).
5. Reduce i and j by the periodicities given by the table size at the specified level k.
6. Bind to CPU as shown in the table at position (i, j, k).

Note that the module uses communication between tasks. Therefore it must not be called before the intertask communication is initialized. In case of MPI it cannot precede the call to MPI_Init().

Note also that the module spawns its own threads. Therefore it must not be called in a region where the calling program already has spawned threads. In case of OpenMP it must be called outside of a so called parallel region.

The current description assumes that the call to the module is explicitly introduced into the source code. However, it can also be introduced by a dynamic instrumentation tool, such as DPCL (see www.ptools.org/projects/index.html#dpcl). DPCL or other dynamic instrumentation tools attach to the program already loaded in memory and allow one to modify the program by adding calls to subroutines (called probes in this context) at places specified by the user. The executable on disk is unchanged. The subroutine described above could be implemented as a probe and added to the program after program either after the program is loaded into the memory or at runtime.

Getting the Table Name and Row Number to the Module

In the first step discussed above it is sufficient to pass the name of the file containing the table with mapping descriptions and the level number. There are several possible ways to pass this information to the subroutine.

In a UNIX operating system these values can be passed as environment variables. These are be set by the user prior to the start of the program.

The subroutine opens a user dialog asking for this information.

The two parameters are passed as parameters to the subroutine.

Figure 10:
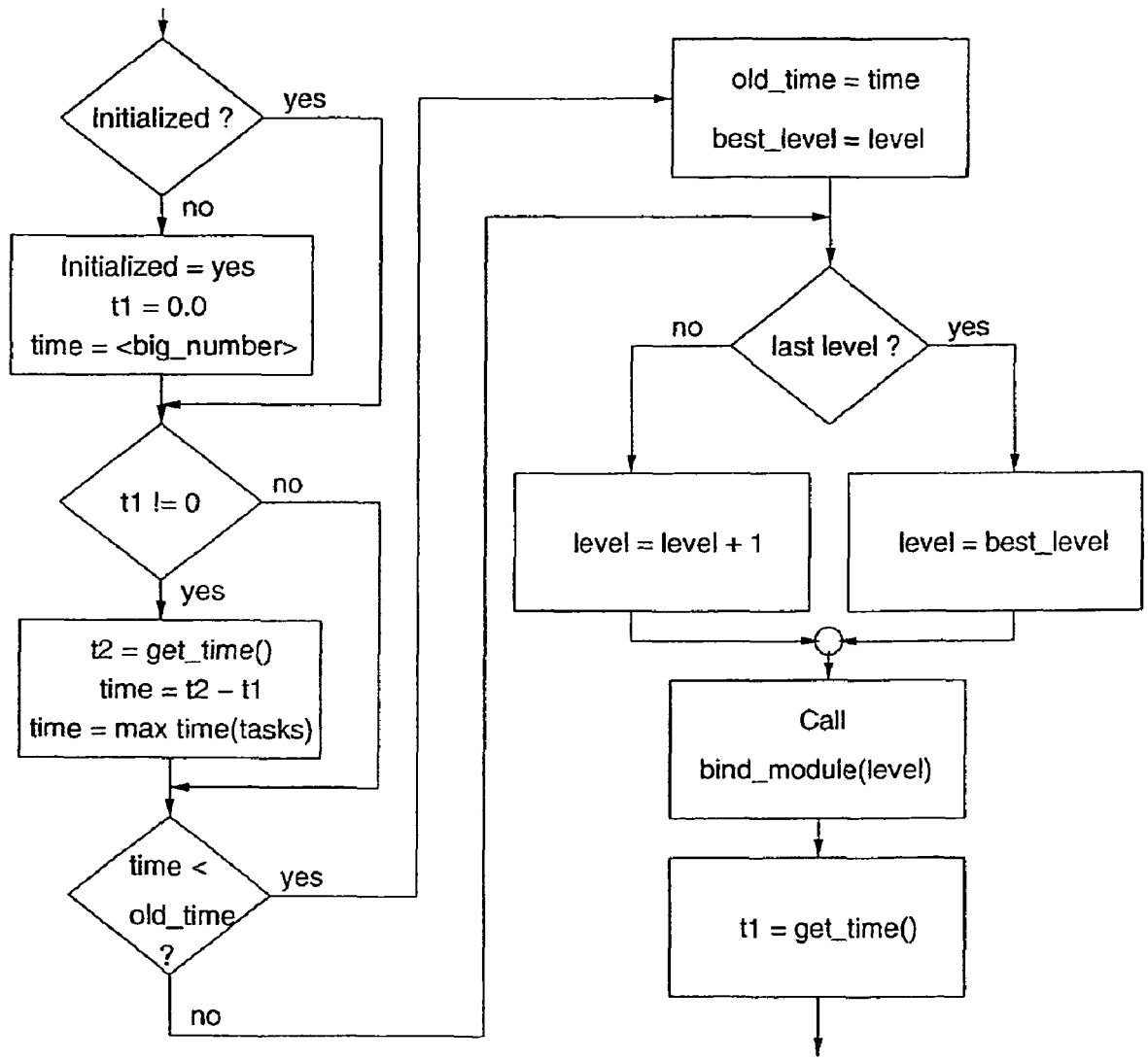

The last choice allows for an extension that interfaces between the program and the original subroutine. A schematic view of such an extension is depicted in FIG. 10 (optimization module for automatic choice of the mapping strategy parameter). This extension is called from every task, but outside the area where the program has spawned threads. So the extension satisfies the same placement restrictions as the binding module itself.

This extension particularly applies if called inside a loop that is repeated many times. The extension module times the loop. This is done by two calls of get_time(), which can be regarded as starting and stopping a timer. Then all table rows are tried and the row with the lowest time is finally taken.

The present invention can also be embedded in a computer program product, which comprises all the features enabling the implementation of the methods described herein, and which when loaded in a computer system is able to carry out these methods.

Computer program means or computer program in the present context mean any expression, in any language, code or notation, of a set of instructions intended to cause a system having an information processing capability to perform a particular function either directly or after either or both of the following: (a) conversion to another language, code or notation; and (b) reproduction in a different material form.

What is claimed is:

1. A method for mapping threads or tasks to CPUs in a parallel computer, wherein at least one parallel program is running in said parallel computer which starts tasks that includes threads, said method comprising the steps of:
   providing a mapping description at runtime, wherein said mapping description specifies a plurality of different mapping strategies of tasks or threads to CPUs;
   selecting a one of the different mapping strategies from the plurality of mapping strategies as a selected mapping;
   distributing said selected mapping to all tasks;
   determining for each task its assigned CPU based on selected mapping strategy; and
   calling a function from the task for binding each of said tasks to its assigned CPU;
   wherein said mapping description is laid down in a three-dimensional table, wherein each row corresponds to a different task identifier, each column represents a different thread identifier, and vertical levels describe various mapping strategies; and
   wherein selection of the selected mapping strategy is done manually or automatically by specifying a row in said three-dimensional table.

2. A method according to claim 1, wherein said mapping description is laid down in a file and is read at runtime when said program starts a first task.

3. A method according to claim 1, wherein manual selection of the selected mapping strategy is done prior to a start of said program or at runtime.

4. A method according to claim 3, wherein said manual selection of the selected mapping strategy at runtime is supported by a user dialog by said parallel program.

5. A method according to claim 1, wherein switching from the selected mapping strategy to another mapping strategy is done automatically at runtime.

6. A method according to claim 5, wherein automatic switching is performed by automatically applying several mapping strategies as specified in said mapping description, measuring their performances, and selecting a mapping strategy with a best performance.

7. A method according to claim 1, wherein all said steps are executed by a subroutine that is part of said parallel program or part of a dynamic instrumentation tool which is loaded either before said program is started or at runtime.

8. A computer program product stored on a computer-usable non-transitory medium comprising computer-readable program means for causing a computer to perform the method of claim 1 when said computer program product is executed on a computer.

9. A system for mapping threads or tasks to CPUs in a parallel computer, wherein said system having a parallel computer and at least one parallel program is running in said parallel computer which starts tasks or threads, said system further comprising:
   a mapping description stored in nonvolatile memory that specifies a plurality of different mapping strategies of tasks or threads to CPUs;
   means for reading said mapping description at runtime;
   means for selecting a one of the different mapping strategies from the plurality of mapping strategies as a selected mapping;
   means for distributing said selected mapping strategy to all tasks;
   means for determining for each task or thread its assigned CPU based on said specified mapping strategy; and
   means for calling a function from the task for binding each of said tasks or threads to its assigned CPU;
   wherein said mapping description is laid down in a three-dimensional table, wherein each row corresponds to a different task identifier, each column represents a different thread identifier, and vertical levels describe various mapping strategies; and
   wherein selection of the selected mapping strategy is done manually or automatically by specifying a row in said three-dimensional table.

10. A system according to claim 9, further comprising means for switching from the selected mapping strategy to another mapping strategy in said table at runtime.

* * * * *